United States Patent [19]
Mao et al.

[11] Patent Number: 6,090,895
[45] Date of Patent: Jul. 18, 2000

[54] CROSSLINKED ION CONDUCTIVE MEMBRANES

[75] Inventors: Shane S. Mao, Maplewood; Steven J. Hamrock, St. Paul; David A. Ylitalo, Stillwater, all of Minn.

[73] Assignee: 3M Innovative Properties Co., St. Paul, Minn.

[21] Appl. No.: 09/084,073

[22] Filed: May 22, 1998

[51] Int. Cl.[7] .................................................. C08F 8/32
[52] U.S. Cl. ................................... 525/330.9; 525/331.2; 525/331.3; 525/331.6; 522/149; 522/151; 522/155; 522/162; 522/164
[58] Field of Search ............... 525/330.9, 331.2, 525/331.3, 331.6; 522/149, 151, 155, 162, 164

[56] References Cited

U.S. PATENT DOCUMENTS

| | | | |
|---|---|---|---|
| 4,468,503 | 8/1984 | Zampini et al. | 525/390 |
| 4,879,338 | 11/1989 | Mercer et al. | 524/538 |
| 5,256,181 | 10/1993 | Manalastas et al. | 71/28 |
| 5,414,117 | 5/1995 | Armand et al. | 562/828 |
| 5,438,082 | 8/1995 | Helmer-Metzmann et al. | 522/149 |
| 5,459,228 | 10/1995 | Armand et al. | 528/373 |
| 5,468,574 | 11/1995 | Ehrenberg et al. | 429/33 |
| 5,530,066 | 6/1996 | Armand et al. | 525/242 |
| 5,627,292 | 5/1997 | Armand et al. | 549/555 |
| 5,691,081 | 11/1997 | Krause et al. | 429/192 |
| 5,721,328 | 2/1998 | Armand et al. | 526/243 |
| 5,741,408 | 4/1998 | Helmer-Metzmann et al. | 204/252 |

FOREIGN PATENT DOCUMENTS

| | | |
|---|---|---|
| 7-018073 | 1/1995 | Japan . |
| 1 457 890 | 12/1976 | United Kingdom . |
| WO 97/19480 | 5/1997 | WIPO . |
| WO 98/50349 | 11/1998 | WIPO . |
| WO 99/38897 | 8/1999 | WIPO . |
| WO/99/38842 | 8/1999 | WIPO . |

OTHER PUBLICATIONS

Buchi et al., *J. Electrochem. Soc.,* 142(9) at 3044 (Sep. 1995).
T. Zawodzinski, et. al., *J. Phys. Chem.,* 1991, 95, 6040.
Hu, L., DesMarteau D. D.; *Inorg. Chem.* 1993, 32, 5007–5010.

*Primary Examiner*—Duc Truong
*Attorney, Agent, or Firm*—Philip Y. Dahl

[57] ABSTRACT

A method is provided for making crosslinked acidic polymers useful as ion conductive membranes, such as crosslinked sulfonated polyether ketones, sulfonated polysulfones, sulfonated polystyrenes, and other acidic polymers, by crosslinking with a species which generates an acidic functionality. The crosslinker preferably binds to acid functions by conversion of acid groups to imide functionality, which, due to the acidity of the N-H bonds therein, compensate for the acidity lost by the occupation of the acid groups and thus preserve membrane conductivity while contributing to membrane strength and resistance to swelling.

26 Claims, No Drawings

CROSSLINKED ION CONDUCTIVE MEMBRANES

FIELD OF THE INVENTION

This invention relates to a method of making crosslinked polymers suitable for use in ion conductive membranes (ICMs) by either: i) crosslinking a polymer having pendant acid halide groups by reaction with a crosslinker which bonds to two or more acid halide groups, or ii) crosslinking a polymer having pendant amide groups, with a crosslinker which bonds to two or more amide groups. The crosslinker preferably binds to the polymer to create imide groups, which serve as acidic functions which enhance the polymer's capacity for ion conductivity.

BACKGROUND OF THE INVENTION

Electrochemical devices, including proton exchange membrane fuel cells, electrolyzers, chlor-alkali separation membranes, batteries, and the like, often employ ion conductive membranes (ICM) as solid electrolytes. In a typical electrochemical cell, an ICM is in contact with cathode and anode electrodes, and transports ions such as protons that are formed at the anode to the cathode, allowing a current of electrons to flow in an external circuit connecting the electrodes. The ICM may contain a polymeric electrolyte. Proton- or cation-conductive ICMs may contain polymeric electrolytes bearing anionic or acidic functional groups such as —$CO_2H$, —$SO_3H$, or other groups bearing acidic protons.

It is a common practice in the industry to use uncrosslinked sulfonated polymers in ICMs, such as Nafion™ (DuPont Chemicals, Inc., Wilmington, Del.) which is made of copolymers of tetrafluoroethylene and perfluorovinylether sulfonic acid. However, commercially available ICMs are not entirely satisfactory in meeting the performance demands of fuel cells. For example, Nafion™ membranes have inherent structural weakness at low equivalent weights. Nafion™ membranes are not generally available at thicknesses of less than 50 µm. Thinner Nafion™ membranes would require reinforcement, thus defeating the purpose of a thin membrane by increasing the overall thickness as well as increasing the electrical resistance of the membrane. While Nafion™ membranes with lower equivalent weight can achieve lower electrical resistance, these lower equivalent weight membranes are also structurally weaker, and therefore still do not obviate the need for reinforcement.

Buchi et al., *J. Electrochem. Soc.*, 142(9) at 3044 (Sep. 1995), discloses proton exchange membranes made by sulfonating a crosslinked polyolefin-polystyrene copolymer. The polymer is crosslinked during polymerization by addition of divinyl benzene.

U.S. Pat. No. 5,438,082 discloses a method of crosslinking a sulfonated aromatic polyether ketone using a two-step, two-part crosslinker. The crosslinking molecule is difunctional, comprising an amine function and a crosslinkable constituent. The crosslinker is attached by its amine function to a sulfonylchloride on the polymer to form a sulfonylamide, which may be a hydrolytically unstable group. This operation consumes an ion conducting sulfonic acid function. After the modified polymer is cast into a membrane, the crosslinkable constituents are joined to form crosslinks. This reference does not disclose or suggest a crosslinker that maintains the acidity of the membrane by forming stable yet highly acidic linkages, such as imide linkages.

U.S. Pat. No. 5,468,574 and WO 97/19,480 (published May 29, 1997) disclose that certain sulfonated polymers will form direct bonds between sulfonate groups upon heating. These references do not disclose the use of any crosslinker. WO 97/19,480 emphasizes that this method requires the sacrifice of sulfonic acid groups and a resulting loss of acidity in the membrane.

SUMMARY OF THE INVENTION

Briefly, the present invention provides a method of making a crosslinked polymer by either: A) crosslinking a polymer having pendant acid halide groups by reaction with a crosslinker which bonds to two or more acid halide groups, or B) crosslinking a polymer having pendant amide groups, with a crosslinker which bonds to two or more amide groups, where, in A) or B), the group formed by binding of the crosslinker is highly acidic. This method may be accomplished by crosslinking a polymer having pendant groups of the formula —$AO_nG$ with a crosslinker of the formula $(JAO_n)_mZ$, where either G is a halide and J is —$NH_2$ or G is —$NH_2$ and J is a halide, where each A is independently C, S or P, where, for each $AO_n$, n=1 when A is C and n=2 when A is S or P, where m>1, and where Z is a polyvalent linker which may be a polymer, a substituted or unsubstituted alkyl, a substituted or unsubstituted aryl or a substituted or unsubstituted heteroatomic function. Preferably the crosslinker binds to the polymer to form imide functions. A preferred crosslinker has the formula $NH_2SO_2RSO_2NH_2$, where R is a substituted or unsubstituted alkyl, a substituted or unsubstituted aryl or a substituted or unsubstituted heteroatomic function, and where R is most preferably —$(CF_2)_4$—. The crosslinker may be added before or after the polymer is cast into a membrane. If the crosslinker is added before the polymer is cast into a membrane, the crosslinking step may be initiated before or after the polymer is cast into a membrane.

In another aspect, the present invention provides crosslinked materials made according to the method of the invention.

In another aspect, the present invention provides crosslinked polymer having crosslinks of the formula:

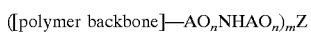

where each A is independently C, S or P, where, for each $AO_n$, n=1 when A is C and n=2 when A is S or P, where m>1, where Z is a polyvalent linker which may be a polymer, a substituted or unsubstituted alkyl, a substituted or unsubstituted aryl or a substituted or unsubstituted heteroatomic function.

In another aspect, the present invention provides crosslinked polymer having crosslinks of the formula:

where R is defined as above.

In another aspect, the present invention provides crosslinked polymer having crosslinks of the formula:

In another aspect, the present invention provides crosslinked polymer made by a difunctional crosslinker having one function which attaches to the polymer to form acidic functions, preferably imide functions, and a second by which crosslinkers are bound to each other.

In another aspect, the present invention provides ion conductive membranes made according to the method of the invention.

What has not been described in the art, and is provided by the present invention, is a generally applicable means to crosslink acidic polymers, such as are typically used in ICM's, by a crosslinker which binds to acid functions and yet which preserves part or all of polymer acidity by generating a new acid function. More specifically, the art does not describe a crosslinker which generates imide functions in binding to an acidic polymer. Furthermore, the art does not describe such a means that may be used either before or after the polymer is cast into a membrane.

In this application:

"amide" means carbonyl amide, sulfonyl amide, or phosphonyl amide;

"imide" means a divalent function having the formula:

where each A is independently chosen from C, S or P, and where, for each $AO_n$, n=1 when A is C and n=2 when A is S or P; or any salt thereof containing the anion created by removal of the proton on nitrogen, having the formula:

where $M^+$ is any cation;

"heteroatomic function" means a group containing a heteroatom, e.g., O, N, S, P, etc., which may be substituted for an alkyl or an aryl group without interfering with the desired product, e.g., heteroatomic functions can be ether, furan, pyrrole, etc.; and "substituted" means substituted by conventional substituents which do not interfere with the desired product, e.g., substituents can be alkyl, alkoxy, aryl, phenyl, halo (F, Cl, Br, I), cyano, nitro, etc.

It is an advantage of the present invention to provide a crosslinked ICM by generation of oxidatively and hydrolytically stable crosslinks without loss of acid functionality. It is an advantage of the present invention to provide a method of crosslinking membranes after casting, including commercially available membranes.

DETAILED DESCRIPTION OF PREFERRED EMBODIMENTS

The present invention provides a method of making a crosslinked polymer by A) crosslinking a polymer having pendant acid halide groups by reaction with a crosslinker which bonds to two or more acid halide groups, or B) crosslinking a polymer having pendant amide groups with a crosslinker which bonds to two or more amide groups, where, in A) or B), the group formed by binding of the crosslinker is highly acidic. Preferably the group formed by binding of the crosslinker has a pKa<5. This method may be accomplished by crosslinking a polymer having pendant groups of the formula —$AO_n$G with a crosslinker of the formula $(JAO_n)_mZ$, where either G is a halide and J is —$NH_2$ or G is —$NH_2$ and J is a halide, where each A is independently C, S or P, where, for each $AO_n$, n=1 when A is C and n=2 when A is S or P, where m>1, and where Z is a polyvalent linker which may be a polymer, a substituted or unsubstituted alkyl, a substituted or unsubstituted aryl or a substituted or unsubstituted heteroatomic function. Preferably the crosslinker binds to the polymer to form imide functions. Preferably A is C or S and most preferably A is S.

High conductivity in an ICM requires a high ratio of acidic sites in the membrane, i.e., a low equivalent weight per acid group. Unfortunately, polymers with low equivalent weight are generally soluble in water and methanol, thus are not of practical use in many electrochemical cell applications such as in fuel cells. Crosslinking of linear polymers into a three dimensional network greatly reduces solubility of the membrane in water and methanol, reduces swelling of the membranes, and decreases shrinkage and expansion of the membrane in response to varying humidity.

Preferably the crosslinker binds to the polymer to form carboxyl or sulfonyl imide functions. Most preferably the crosslinker forms at least one bis(sulfonyl)imide function. The bis(sulfonyl)imide is stable in strong acidic conditions and in oxidative conditions, and itself is a strong acid, typically having a pKa<5. Where the binding of the crosslinker forms bis(sulfonyl)imide functions, the acidity lost by occupation of two acid groups on the polymer is compensated by the formation of strong acid group created on the crosslinker itself. As a result, pre-formed membranes or commercially available membranes can be crosslinked without significant loss of acidity.

Any appropriate acidic or anionic ion-conducting polymer may be used as a starting material, including polymers containing pendant sulfonic acid or carboxylic acid groups. Preferred polymers include polyether ether ketone (PEEK, available from American Hoechst Corp., Somerville, N.J.), sulfonated polyether ether ketone (PEEK—$SO_3H$), polysulfone (Amoco, Chicago, Ill.), sulfonated polysulfone, polystyrene (available from Union Carbide Corp., Danbury, Conn.), sulfonated polystyrene, polyphenylene oxide (available from General Electric Co., Pitsfield, Mass.), sulfonated polyphenylene oxide, sulfonated polyimide, Nafion™ (DuPont Chemical Co., Wilmington, Del.), co-polymers of the above, graft co-polymers of the above, and substituted polymers of the above, including in particular fluorinated polymers such as sulfonated poly-α,β,β-trifluorostyrene. Acid groups may be converted to acid chloride groups by any appropriate method, including reaction with thionyl chloride. Non-sulfonated polymers may be converted to polymers bearing sulfonyl chloride groups by any appropriate method. Non-sulfonated aromatic polymers can be converted directly to polymers bearing sulfonyl chloride groups by treatment with chlorosulfonic acid.

Suitable crosslinkers include any molecule which bonds to two or more acid halide groups. Preferably the crosslinker binds to the polymer to form imide functions. Preferred crosslinkers comprise two or more amide functions, particularly carboxyl amide or sulfonyl amide functions. Crosslinkers may include $NH_3$, $NH_4OH$, and crosslinkers of the formula $(NH_2AO_n)_mZ$, where each A is independently C, S or P, where, for each $AO_n$, n=1 when A is C and n=2 when A is S or P, where m>1, and where Z is a polyvalent linker which may be a polymer, a substituted or unsubstituted alkyl, a substituted or unsubstituted aryl or a substituted or unsubstituted heteroatomic function. Preferably A is C or S and most preferably A is S. Preferred crosslinkers include $NH_4OH$ and crosslinkers of the formula $NH_2SO_2RSO_2NH_2$, where R is a substituted or unsubstituted alkyl, a substituted or unsubstituted aryl or a substituted or unsubstituted heteroatomic function. Exemplary crosslinkers are $NH_2SO_2CF_2CF_2CF_2CF_2SO_2NH_2$, $NH_2C(O)CF_2CF_2CF_2CF_2C(O)NH_2$, and $NH_2SO_2C_6H_2Cl_2SO_2NH_2$. Crosslinkers may be made by any appropriate method. Alternately, the amide groups and the acid halide groups may be reversed. In this case, a polymer having pendant amide groups may be used with a crosslinker which bonds to two or more of the amide groups. Preferably, the crosslinker comprises acid halide groups which react with the polymer to form carboxyl or sulfonyl imide functions, and most preferably the crosslinker and polymer form at least one bis(sulfonyl)imide function. Crosslinkers may have the formula $(XAO_n)_mZ$, where X is a halide and preferably Cl, where each A is independently C, S or P, where, for each $AO_n$, n=1 when A is C and n=2 when A is S or P, where m>1, and where Z is a polyvalent linker which may be a polymer, a substituted or unsubstituted alkyl, a substituted or unsubstituted aryl or a substituted or unsubstituted heteroatomic function. Preferably A is C or S and most preferably A is S. Most preferred crosslinkers include crosslinkers of the formula $XSO_2RSO_2X$, where X is a halogen, preferably Br or Cl and most preferably Cl, and R is a substituted or unsubstituted alkyl, a substituted or unsubstituted aryl or a substituted or unsubstituted heteroatomic function.

Alternately, a difunctional crosslinker can be used, having a polymer-binding functional group and a crosslinker-binding functional group. The polymer-binding functional group attaches to the polymer to form acidic functionality, preferably imide functionality, in the same manner as the crosslinkers discussed above. The crosslinker-binding functional group provides for binding of the crosslinkers to each other, either simultaneously with the binding of the crosslinker to the polymer or, preferably, subsequent to binding of the crosslinker to the polymer. The second functional group can be any function suitable for forming bonds between crosslinker molecules, including ethylenic unsaturation such as trifluorovinylether, trifluorostyrene, (meth)acrylate, vinyl cinnamic acid, epoxides, isocyanates, silanes such as dialkoxysilane, trialkoxysilane, trichlorosilane, or any other suitable function. The reaction of the second functional group may be energetically activated, such as a photopolymerization or a thermal polymerization. The reaction of the second functional group may be activated or augmented by addition, before or during reaction, of catalysts or initiators.

The crosslinker and the polymer may be mixed under anhydrous conditions before or after the polymer is cast into a film. The mixture is preferably made in an aprotic solvent but may be made without solvent. If the components are pre-mixed, the crosslinking reaction may be activated before or after the mixture is cast into a film. To preserve the acid halide groups, care should be taken to exclude water and other species that may react with acid halide groups prior to the crosslinking reaction. Acid halide—amide reactions may be activated by application of any appropriate base, which preferably includes trialkylamine, pyridine or NaOH. Application of crosslinker and activation of the crosslinker, e.g. by addition of base, may be accomplished simultaneously or in two separate steps. Mixing and film formation may be by any appropriate method.

After reaction, unreacted acid halide functions may be hydrolyzed with water or dilute NaOH. The resulting polymers may be converted into Bronsted acids or into salts of any cation by cation exchange. Any cationic species may be used, including $H^+$ (providing a Bronsted acid), metal cations, and organic cations such as alkyl ammonium cations. Salts of alkali metal cations such as $Li^+$, $Na^+$, $K^+$, etc., are preferred and may result in membranes that are useful as battery electrolytes. Conversion into acidic form is most preferred. The polymers may be converted into acids by exchange with nitric acid.

In one preferred embodiment, a homogeneous film is cast from a THF solution of a mixture of $PEEK-SO_2Cl$ or polysulfone-$SO_2Cl$ with a crosslinker, $NH_2SO_2CF_2CF_2CF_2CF_2SO_2NH_2$. $PEEK-SO_2Cl$ or polysulfone-$SO_2Cl$ are obtained by chlorosulfonation of PEEK or polysulfone. Dipping the membrane into a basic solution such as triethylamine or aqueous NaOH solution causes the reaction between sulfonamide and sulfonyl chloride, forming a strong acid bis(sulfonyl)imine. In addition, sulfonyl chloride groups which do not react with the crosslinker are hydrolyzed into sulfonic acid groups. This reaction is illustrated following:

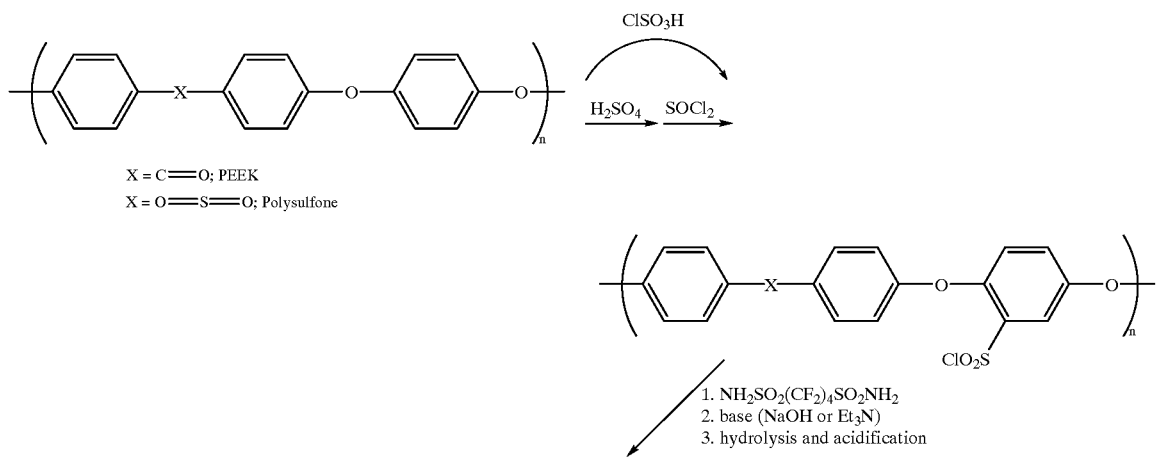

-continued

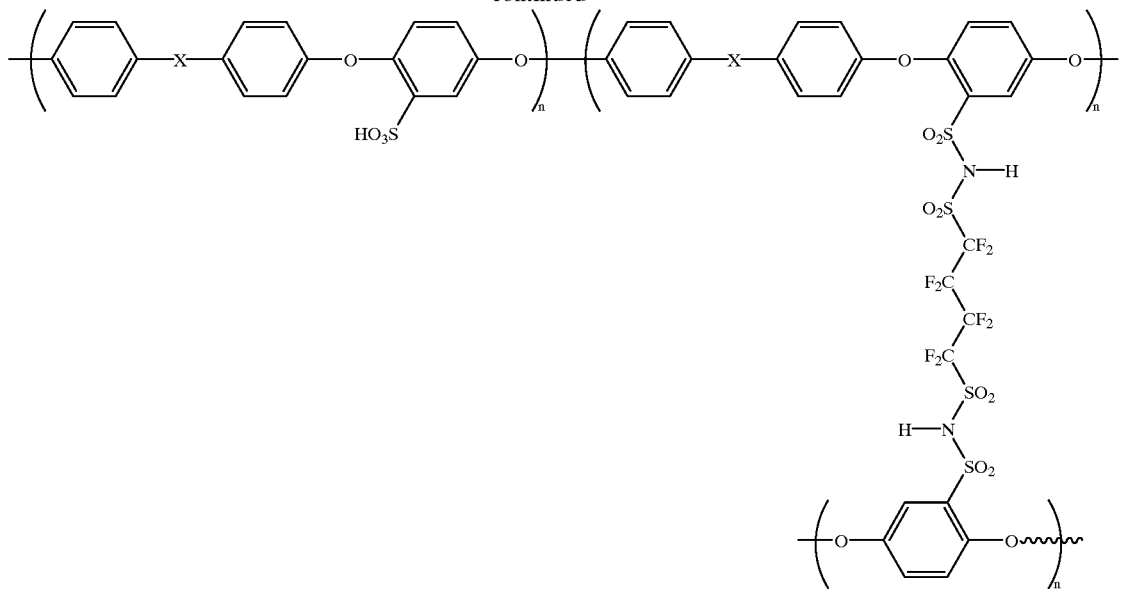

The resulting films are typically methanol insoluble and exhibit reduced swelling in water, typically exhibiting a 40% increase in weight when soaked in water overnight. The proton conductivity of these crosslinked membranes is high, typically 0.02 to 0.06 S/cm at room temperature, close to the conductivity of the uncrosslinked membranes. This invention is useful in the preparation or modification of ion conductive materials having higher strength and ion conductivity, such as ICMs for use in electrochemical cells. Objects and advantages of this invention are further illustrated by the following examples, but the particular materials and amounts thereof recited in these examples, as well as other conditions and details, should not be construed to unduly limit this invention.

EXAMPLES

Unless otherwise noted, reagents and equipment used herein are available through Aldrich Chemical Co., Milwaukee, Wis.

In the Experiments herein, films were cast from a dimethyl formamide (DMF), N-methyl pyrrolidinone (NMP) or cyclopentanone solution by pouring onto a glass or silicon substrate, followed by drying first at room temperature and then at 100° C. In the Experiments herein, water absorption capacity was measured as follows: samples were first immersed in water until no further weight gain was observed and the maximum weight was recorded. Unless otherwise specified, the water is at room temperature. Then the samples were vacuum-dried at 100° C. and 0.1 torr for 24 hours and weighed again. Water absorption capacity is calculated as the difference between the wet and dry weights divided by the dry weight, reported herein as a percentage. The conductivity test used herein is based on the test published at T. Zawodzinski, et. al., *J. Phys. Chem.*, 1991, 95, 6040. The membrane to be tested is boiled in DI water for 1 hour prior to testing. The membrane is fitted in a cell and submersed in water at room temperature and the ohmic (real) and capacitive (imaginary) components of the membrane impedance are measured by impedance spectroscopy at a frequency range of from 100 kHz to 10 Hz, 0V DC and 100 mV AC. A plot of imaginary vs. real impedance (impedance plot or Nyquist plot) is generated which affords a curve which may be extrapolated to zero capacitance, where the ohmic resistance is measured. Conductivity in S/cm is calculated from the measured value of resistance, along with the cell constant and the membrane thickness.

Example 1
Preparation of Sulfonated Polyetheretherketone (PEEK-SO$_3$H):

A series of solutions were made by adding 30 g of polyetheretherketone (PEEK, available from Hoechst AG, Frankfurt, Germany) and 400 mL of concentrated sulfuric acid (100–102%) to 500 mL Telflon-Sealed glass bottles. The bottles were sealed and shaken at room temperature on a mechanical shaker for various times between 10 and 190 hours, with the degree of sulfonation increasing with time. The resulting viscous red solutions were then poured into 4 L of a stirred mixture of ice and water. The precipitates were collected, crushed into fine powder and washed with water until the washings were pH-neutral. The white polymer powders were then dried in vacuum (0.1 torr) at 40° C. for 24 h.

These polymers (PEEK-SO$_3$H) are soluble in DMF, NMP and cyclopentanone. The solubility in alcohol and hot water increases with an increasing degree of sulfonation. Water absorption capacity of these membranes ranges from 40% to 5000%, increasing with degree of sulfonation. The room temperature conductivity of the membranes ranges from 0.01 to 0.06 S/cm, increasing with degree of sulfonation. Transparent, free standing films or membranes can be cast from solutions of PEEK-SO$_3$H. Wet membranes with a high degree of sulfonation have high conductivity but poor mechanical strength; while wet membranes with a low degree of sulfonation have good mechanical strength but very low conductivity.

Example 2
Preparation of a Sulfonyl Chloride of Polyetheretherketone (PEEK-SO$_2$Cl):

10 g of sulfonic acid (PEEK-SO$_3$H, prepared as described in Example 1 with 190 hours of sulfonation) and 80 mL of thionyl chloride were charged in a 250 mL round bottom flask. The mixture was refluxed for 12 h under nitrogen. A viscous and homogeneous solution formed. The mixture was then poured into 500 mL of a stirred mixture of ice and water. A yellow precipitate was collected, crushed into powder and washed with large amount of water until the washings were pH-neutral. The polymer was then washed with methanol twice, and dried at 40° C. in vacuum (0.1 torr) for 24 h. Yield: 9.8 g (93%).

The polymer (PEEK-SO$_2$Cl) is soluble in DMF, NMP, cyclopentanone, dichloroethane, THF and insoluble in alcohol and water. Transparent, free standing membranes can be made from solutions of PEEK-SO$_2$Cl. The membranes can be hydrolyzed with dilute sodium hydroxide solution, and subsequently converted to the sulfonic acid form by exchanging in nitric acid. The hydrolyzed membrane has a room temperature conductivity of 0.060 S/cm. Although the hydrolyzed membrane has a high conductivity, it swells significantly in cold water, and dissolves in boiling water.

Example 3

Alternative Procedure to PEEK-SO$_2$Cl:

300 mL of chlorosulfonic acid was charged in a 500 mL round bottom flask. 30 g of PEEK was added under nitrogen atmosphere. The mixture was stirred for 2 h. The reddish solution was then poured into 4 L of a stirred mixture of ice and water. The precipitate was collected and crushed into fine powder, and washed with water until the washings were pH-neutral. The polymer was then washed with methanol twice, and dried at 40° C. in vacuum (0.1 torr) for 24 h. Yield: 35 g (89%).

As in Example 2, the polymer (PEEK-SO$_2$Cl) is soluble in DMF, NMP, cyclopentanone, dichloroethane, THF and insoluble in alcohol and water. Transparent, free standing membranes can be made from these solutions. The membranes can be hydrolyzed with dilute sodium hydroxide solution, and converted to the sulfonic acid form by exchanging in nitric acid. The hydrolyzed membrane has a room temperature conductivity of 0.060 S/cm. It swells significantly in cold water, and dissolves in boiling water.

Example 4

Crosslinking PEEK-SO$_2$Cl with NH$_2$SO$_2$C$_6$H$_2$Cl$_2$SO$_2$NH$_2$

To a flask was added: between 0.00 g and 0.20 g (as specified in Table I) of NH$_2$SO$_2$C$_6$H$_2$Cl$_2$SO$_2$NH$_2$ (available from Sigma Chemical Co., St. Louis, Mo.), 1.0 g of PEEK-SO$_2$Cl (made according to Example 2), and 9 mL of cyclopentanone. Homogeneous solutions formed. While stirring, 0.6 g of Et$_3$N was added dropwise. The solutions gelled in between 2 and 20 mins. The gels were filtered, washed with large amounts of water and then methanol, and then dried at 40° C. in vacuum (0.1 torr) for 24 h to obtain white solids. The crosslinked polymers were insoluble in common solvent, but swelled in NMP and DMF. Table I shows measured swelling in boiling water for materials with different crosslink density. Table I also shows nitrogen content for the various materials, measured by combustion analysis, reflecting the amount of crosslinker incorporated in the final polymer.

| Example | 4A | 4B | 4C | 4D | 4E |
|---|---|---|---|---|---|
| PEEK-SO$_2$Cl (g) | 1.0 | 1.0 | 1.0 | 1.0 | 1.0 |
| Crosslinker (g) | 0.00 | 0.05 | 0.10 | 0.15 | 0.20 |
| Absorption capacity, boiling water % | Soluble | 1480 | 82 | 27 | 21 |
| N analysis (%) | <0.1 | 0.40 | 0.71 | 1.10 | 1.35 |

Example 5

Crosslinking PEEK-SO$_2$Cl with NH$_2$SO$_2$(CF$_2$)$_4$SO$_2$NH$_2$

To a flask was added: between 0.00 g and 0.20 g (as specified in Table II) of NH$_2$SO$_2$(CF$_2$)$_4$SO$_2$NH$_2$ (which may be synthesized by known methods, including the method described at Hu, L.; DesMarteau D. D.; Inorg. Chem. 1993, 32, 5007–5010), 1.0 g of PEEK-SO$_2$Cl (made according to Example 2), and 9 mL of cyclopentanone. Homogeneous solutions formed. While stirring, 0.6 g of Et$_3$N was added dropwise. The solutions gelled at between 1 and 10 mins. The gels were filtered, washed with large amounts of water and then methanol, and then dried at 40° C. in vacuum (0.1 torr) for 24 h to obtain white solids. The crosslinked polymers were insoluble in common solvent, but swelled in NMP and DMF. Table II shows measured swelling in boiling water for materials with different crosslink density. Table I also shows nitrogen content for the various materials, measured by combustion analysis, reflecting the amount of crosslinker incorporated in the final polymer.

TABLE II

| Example | 5A | 5B | 5C | 5D | 5E |
|---|---|---|---|---|---|
| PEEK-SO$_2$Cl (g) | 1.0 | 1.0 | 1.0 | 1.0 | 1.0 |
| Crosslinker (g) | 0.00 | 0.05 | 0.10 | 0.15 | 0.20 |
| Absorption capacity, boiling water (%) | Soluble | 851 | 186 | 175 | 110 |
| N analysis (%) | 0.16 | 0.53 | 0.80 | 1.02 | 1.27 |

Example 6

Membrane Preparation: PEEK-SO$_2$Cl with NH$_2$SO$_2$C$_6$H$_2$Cl$_2$SO$_2$NH$_2$ To a flask was added 1.0 g of PEEK-SO$_2$Cl (made according to Example 2), 9 mL of cyclopentanone and 100 mg of NH$_2$SO$_2$C$_6$H$_2$Cl$_2$SO$_2$NH$_2$ (available from Sigma Chemical Co., St. Louis, Mo.). A homogeneous solution was formed. While stirring, 0.3 g of Pr$_3$N was added dropwise, and the solution was quickly cast on a flat glass dish. After allowing to dry overnight, the dish was then placed in water, and the membrane was detached from the glass. The membrane was hydrolyzed in 5% sodium hydroxide aqueous solution for 12 hours, and then exchanged twice in 20% nitric acid for 1 hour. The membrane was then immersed in a mixture of 30% methanol and 70% water at 50° C. for 30 min, whereupon the membrane became a transparent film. The film was then exchanged in DI water several times. The membrane was insoluble in common solvents but swelled somewhat in water. The water absorption capacity of the membrane in boiling water was 163%, reduced from infinite (i.e. dissolution) for the uncrosslinked material. The water absorption capacity of the membrane was 40% in cold water, reduced from 5000% for the uncrosslinked material. The conductivity measured at room temperature was 0.06 S/cm.

Example 7

Membrane Preparation: PEEK-SO$_2$Cl with NH$_2$SO$_2$(CF$_2$)$_4$SO$_2$NH$_2$

To a flask was added 1.0 g of PEEK-SO$_2$Cl (made according to Example 2), 9 mL of cyclopentanone and 100 mg of NH$_2$SO$_2$(CF$_2$)$_4$SO$_2$NH$_2$ (which may be synthesized by known methods, including the method described at Hu, L.; DesMarteau D. D.; Inorg. Chem. 1993, 32, 5007–5010). A homogeneous solution was formed. While stirring, 0.3 g of Pr$_3$N was added dropwise, and the solution was quickly cast on a flat glass dish. After drying overnight, the substrate was then placed in water, and the membrane was detached from the glass. The membrane was hydrolyzed in 5% sodium hydroxide aqueous solution for 12 hours, and then exchanged twice in 20% nitric acid for 1 hour. The membrane was then immersed in a mixture of 30% methanol and 70% water at 50° C. for 30 min, whereupon the membrane became a transparent film. The film was then exchanged in DI water several times. The resulting membrane was insoluble in common solvents but swelled in water. The water absorption capacity of the membrane in boiling water was 101%, reduced from infinite (i.e. dissolution) for the uncrosslinked material. The water absorption capacity of the membrane was 30% in cold water, reduced from 5000% for the uncrosslinked material. The conductivity measured at room temperature was 0.065 S/cm.

Example 8

Membrane Preparation: PEEK-SO$_2$Cl with NH$_2$SO$_2$(CF$_2$)$_4$SO$_2$NH$_2$

To a flask was added 1.0 g of PEEK-SO$_2$Cl (made according to Example 2), 9 mL of cyclopentanone and 100 mg of NH$_2$SO$_2$(CF$_2$)$_4$S$_2$NH$_2$ (which may be synthesized by known methods, including the method described at Hu, L.; DesMarteau D. D.; Inorg. Chem. 1993, 32, 5007–5010). The homogeneous solution thus formed was quickly cast on a flat glass dish. After drying overnight, the substrate was then placed in a triethylamine solution with 5% of cyclopentanone for 24 hours. The membrane was then hydrolyzed in 5% sodium hydroxide aqueous solution for 12 hours, and then exchanged twice in 20% nitric acid for 1 hour. The membrane was then immersed in a mixture of 30% methanol and 70% water at 50° C. for 30 min, whereupon the membrane became a transparent film. The film was then exchanged in DI water several times. The resulting membrane was insoluble common solvents but swelled in water. The water absorption capacity of the membrane at room temperature was 40%. The conductivity measured at room temperature was 0.055 S/cm.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a crosslinked polymer comprising the step selected from steps i) and ii):
    i) crosslinking a polymer having pendant acid halide groups by reaction with a crosslinker which bonds to one or more acid halide groups to contribute one or more groups having pKa<5,
    ii) crosslinking a polymer having pendant amide groups, with a crosslinker which bonds to one or more amide groups to contribute one or more groups having pKa<5.

2. The method according to claim I wherein said crosslinker binds to said polymer having pendant groups to form an imide group of the formula:

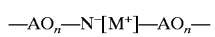

wherein each A is independently chosen from the group consisting of C, S and P, wherein, for each AO$_n$, n=1 when A is C and n=2 when A is S or P; and wherein M$^+$ is any cationic species including H$^+$.

3. The method according to claim 2 comprising step i) wherein said crosslinker is selected from the set consisting of ammonia, ammonium and NH$_2$SO$_2$RSO$_2$NH$_2$, where R is a substituted or unsubstituted alkyl, a substituted or unsubstituted aryl or a substituted or unsubstituted heteroatomic functionality.

4. The method according to claim 3 wherein said crosslinker is selected from the group consisting of ammonia, ammonium, NH$_2$SO$_2$(CF$_2$)$_4$SO$_2$NH$_2$, and NH$_2$SO$_2$(C$_6$H$_4$Cl$_2$)SO$_2$NH$_2$.

5. The method according to claim 1 comprising step ii) wherein said crosslinker has the formula XSO$_2$RSO$_2$X, where X is a halogen and R is a substituted or unsubstituted alkyl, a substituted or unsubstituted aryl or a substituted or unsubstituted heteroatomic functionality.

6. The method according to claim 1 comprising step i) additionally comprising the step of:
    iii) forming a crosslinkable mixture by mixing said polymer having pendant acid halide groups with said crosslinker which bonds to two or more acid halide groups,
followed by, in any order, the steps of:
    iv) forming a film of the mixture, and
    v) crosslinking the polymer by exposing the crosslinkable mixture to an alkaline environment.

7. The method according to claim 1 comprising step i) which comprises the sequential steps of:
    vi) forming a film of said polymer having pendant acid halide groups,
    vii) crosslinking the polymer by applying, under reactive conditions, said crosslinker which bonds to two or more acid halide groups.

8. The method according to claim 1 comprising step ii) additionally comprising the step of:
    viii) forming a crosslinkable mixture by mixing said polymer having pendant amide groups with said crosslinker which bonds to two or more amide groups,
followed by, in any order, the steps of:
    ix) forming a film of the crosslinkable mixture, and
    x) crosslinking the polymer by exposing the crosslinkable mixture to an alkaline environment.

9. The method according to claim 1 comprising step ii) which comprises the sequential steps of:
    xi) forming a film of said polymer having pendant amide groups,
    xii) crosslinking the polymer by applying, under reactive conditions, said crosslinker which bonds to two or more amide groups.

10. A method of making a crosslinked polymer comprising the step of crosslinking a polymer having pendant groups of the formula —AO$_n$G by reaction with a crosslinker of the formula(JAO$_n$)$_m$Z, where either G is a halide and J is —NH$_2$ or G is —NH$_2$ and J is a halide, where each A is independently C, S or P, where, for each AO$_n$, n=1 when A is C and n=2 when A is S or P, where m>1, and where Z is a polyvalent linker which may be a polymer, a substituted or unsubstituted alkyl, a substituted or unsubstituted aryl or a substituted or unsubstituted heteroatomic function.

11. The method according to claim 10 wherein said crosslinker is selected from the set consisting of ammonia, ammonium and NH$_2$SO$_2$RSO$_2$NH$_2$, where R is a substituted or unsubstituted alkyl, a substituted or unsubstituted aryl or a substituted or unsubstituted heteroatomic functionality.

12. The method according to claim 10 wherein said crosslinker is selected from the group consisting of ammonia, ammonium, NH$_2$SO$_2$(CF$_2$)$_4$SO$_2$NH$_2$, and NH$_2$SO$_2$(C$_6$H$_4$Cl$_2$)SO$_2$NH$_2$.

13. The method according to claim 10 wherein said crosslinker has the formula $XSO_2RSO_2X$, where X is a halogen and R is a substituted or unsubstituted alkyl, a substituted or unsubstituted aryl or a substituted or unsubstituted heteroatomic functionality.

14. The method according to claim 10 additionally comprising the step of:

xiii) forming a crosslinkable mixture by mixing said polymer having pendant groups with said crosslinker, followed by, in any order, the steps of:

xiv) forming a film of the mixture, and xv) crosslinking the polymer by exposing the crosslinkable mixture to an alkaline environment.

15. The method according to claim 10 which comprises the sequential steps of:

xvi) forming a film of said polymer having pendant groups, xvii) crosslinking the film by applying, under reactive conditions, said crosslinker.

16. A material made according to the method of claim 1.

17. A material made according to the method of claim 6.

18. A membrane made according to the method of claim 7.

19. A membrane made according to the method of claim 8.

20. A crosslinked polymer having crosslinks of the formula:

[polymer backbone]—$SO_2N^-[M^+]SO_2$—[polymer backbone]

wherein $M^+$ is any cationic species including $H^+$.

21. The method of claim 1 wherein said crosslinker comprises a polymer-binding functionality and a crosslinker-binding functionality.

22. The method of claim 21 additionally comprising the step of binding together crosslinker molecules that are bound to said polymer.

23. A method of making a crosslinked polymer that comprises an imide group of formula I:

$$—AO_n—N^-[M^+]—AO_n— \quad (I)$$

wherein each A is independently chosen from the group consisting of C, S and P, wherein, for each $AO_n$, n=1 when A is C and n=2 when A is S or P; and wherein $M^+$ is any cationic species including $H^+$, from a polymer that does not comprise an imide group of formula I above.

24. The method of claim 23 which comprises crosslinking a polymer that does not comprise an imide group of formula I above.

25. A material made according to the method of claim 23.

26. A material made according to the method of claim 24.

* * * * *